US006160220A

United States Patent [19]

Takimura et al.

[11] Patent Number: 6,160,220

[45] Date of Patent: Dec. 12, 2000

[54] TERMINAL COVER FOR ELECTRICAL EQUIPMENT

[75] Inventors: Fumihiro Takimura; Kyoichi Yamamoto; Tsuyoshi Sekiguchi, all of Nagoya, Japan

[73] Assignee: Mitsubishi Denki Kabushiki Kaisha, Tokyo, Japan

[21] Appl. No.: 09/119,938

[22] Filed: Jul. 21, 1998

[30] Foreign Application Priority Data

Mar. 30, 1998 [JP] Japan ................................. 10-084488

[51] Int. Cl.[7] ....................................................... H02G 3/14

[52] U.S. Cl. ............................ 174/66; 220/241; 439/536

[58] Field of Search ................................. 174/66, 67, 55; D8/353; D13/156, 177; 220/241, 242, 3.8; 439/536; 33/528

[56] References Cited

U.S. PATENT DOCUMENTS

| | | | |
|---|---|---|---|
| 3,437,737 | 4/1969 | Wagner | 174/55 |
| 4,293,173 | 10/1981 | Tricca | 439/148 |
| 4,803,380 | 2/1989 | Jacoby, Jr. et al. | 307/157 |
| 5,041,698 | 8/1991 | Takagi et al. | 174/66 |
| 5,696,350 | 12/1997 | Ankor | 174/66 |

FOREIGN PATENT DOCUMENTS

| | | | |
|---|---|---|---|
| 59-114897 | 7/1984 | Japan . | |
| 64-29725 | 2/1989 | Japan . | |
| 1-109140 | 7/1989 | Japan . | |
| 405121880 | 5/1993 | Japan | 174/66 |

*Primary Examiner*—Dean A. Reichard
*Assistant Examiner*—Dhiru R Patel
*Attorney, Agent, or Firm*—Sughrue, Mion, Zinn, Macpeak & Seas, PLLC

[57] ABSTRACT

A terminal cover for electrical equipment has two pieces of substantially U-shaped elastic engaging piece section each with an outer edge thereof integrally connected to the terminal cover and the other edge in the inner side thereof coupled to that of the other one with a bridging piece section provided therein, counter claw sections are formed on the two pieces of elastic engaging piece section respectively, and the terminal cover is fixed to a frame of equipment by engaging the counter claw sections in recesses for engagement formed on the frame of the equipment respectively.

13 Claims, 13 Drawing Sheets

TERMINAL COVER FOR ELECTRICAL EQUIPMENT

FIELD OF THE INVENTION

The present invention relates to a terminal cover for covering and protecting a section of a terminal plate for electrical equipment such as an electromagnetic contactor.

BACKGROUND OF THE INVENTION

FIG. 22 and FIG. 23 show a conventional type of terminal cover disclosed in Japanese Patent Laid-Open Publication No. SHO 59-114897. In the figures, designated at the reference numeral 10 is a frame for electrical equipment such as an electro-magnetic contactor, at 12 a terminal plate of each pole projecting to the outside of the frame 10, at 13 a terminal screw attached to each of the terminal plates 12, at 14 two pieces of interpole insulating barrier plate partitioning the terminal plate 12 of each pole, and at 16 a terminal cover respectively.

The terminal cover 16 has two pieces of vertical polar body 22 and a U-shaped elastic engaging piece 24 each provided downward on the rear face thereof (toward the side of the electrical equipment). The elastic engaging piece 24 is integrally connected to the terminal cover 16 at one edge of the piece with the other edge thereof which is a free edge 24*a* to be open, and a counter claw section 26 is provided on the outside of the piece adjacent to the free edge 24*a*. Formed on the terminal cover 16 is an opening 28 for inserting a tool T for removal from the upper side of the cover toward the free edge 24*a* of the elastic engaging piece 24.

The terminal cover 16 is mounted onto electrical equipment in the following way; namely, in a state where the terminal cover 16 is set to the upper side of a top surface 10*a* of the frame 10 for the electrical equipment in the direction indicated by the arrow A in FIG. 22, guide grooves 20 are provided in the interpole insulating barrier plates 14 in the vertical direction to the terminal plate 12 respectively, and the vertical polar bodies 22 which hang down are inserted to the guide grooves 20 each vertically formed on the side face of the interpole insulating barrier plate 14 for engagement respectively, and the terminal cover 16 is pressed down in a state where the sticks are inserted and engaged therein. When the terminal cover 16 is pressed down as far as a position where the cover contacts the top surface 10*a* of the frame 10, the counter claw section 26 provided adjacent to the free edge 24*a* of the elastic engaging piece 24 is engaged in a recess 30 for engagement formed on the side face 10*b* of the frame 10. With this operation, the terminal cover 16 is fixed to the frame 10 in a state where the top surface 10*a* of the frame 10 is covered by the terminal cover 16.

When the terminal cover 16 is removed from the frame, the tool T for removal is inserted from the opening 28 into a section between the free edge 24*a* of the elastic engaging piece 24 and the side face 10*b* of the frame 10, the counter claw section 26 is removed out of the recess 30 for engagement by elastically deforming the free edge 24*a* in the direction indicated by the arrow B in FIG. 23, and the terminal cover 16 is removed from the frame 10 by being held upward in a state where an engagement relation between the counter claw sections 26 and the recess 30 for engagement is released.

In the conventional type of terminal cover, the engagement between the counter claw section 26 and the recess 30 for engagement is obtained, in a state where the terminal cover is mounted on the frame, just by pressing down the counter claw section 26 to the recess 30 for engagement, and for this reason, if some counter force is applied to the engagement realized by pressing the counter claw section 26 to the recess 30 for engagement from one direction under such bad environments that vibrations or shocks are applied onto the electrical equipment, the engagement therebetween may not be maintained because the counter claw section 26 may be disengaged from the recess 30 for engagement thereby or the engagement between the counter claw section 26 and the recess 30 for engagement may become unstable due to deformation of the counter claw section 26 within the recess 30 for engagement for each application of the force to the engagement in the reverse direction and abrasion or disappearance of contact surfaces between the counter claw section 26 and recess 30 for engagement, so that a mounted state of the terminal cover on the frame is not reliable and durable.

Also, in the conventional type of terminal cover, when the electrical equipment is an electromagnetic contactor or the like, there is sometimes a case where the recess 30 for engagement is provided on the wall surface of a frame for the electro-magnetic contactor and an adjacent portion of this wall surface may face to a wall surface of an arc box for cutting off a current. As inside of the wall surface of the arc box is adjacent to a portion where a high-temperature arc under high pressure is generated, the portion of the recess 30 for engagement has a high temperature during the operation of the electromagnetic contactor, and under such bad environmental conditions, the counter claw section 26 engaged in the recess 30 for engagement is also put under the high temperature. For this reason, heat loss such as heat deformation or melting occurs in the counter claw section 26, which causes the counter claw section 26 to be disengaged from the recess 30 for engagement or to be stuck or adhered thereto, so that it may be impossible to remove the terminal cover 16 from the electrical equipment.

SUMMARY OF THE INVENTION

It is an object of the present invention to obtain, for the purpose of solving the problems described above, a terminal cover for electrical equipment which is excellent in reliability and durability in the mounted state used under such bad conditions that vibrations or shocks are applied thereto, and which is excellent in durability and safety without being damaged by heat loss even during use of an electromagnetic contactor or the like.

With the terminal cover for electrical equipment according to the present invention, there are two pieces of substantially U-shaped elastic engaging piece section each with an outer edge thereof integrally connected to the terminal cover and the other edge in the inner side thereof coupled to that of the other one with a bridging piece section, and the terminal cover is fixed to a frame of equipment by engaging the counter claw sections formed on the two pieces of elastic engaging piece section in recesses for engagement formed on the frame of the equipment respectively, so that the elastic engaging piece sections are not moved under the condition of some force applied thereto from outside, and engagement between the counter claw sections and the recesses for engagement is comparatively firm, and for this reason, the terminal cover can securely be mounted on the equipment. In addition, the engagement between the counter claw sections and the recesses for engagement can accurately be released in response to an operation of displacing the bridging piece section.

With the terminal cover for electrical equipment according to the present invention, there are two pieces of substantially U-shaped elastic engaging piece section each with an outer edge thereof integrally connected to the terminal cover and the other edge in the inner side thereof coupled to that of the other one with a bridging piece section, and magnets mounted on the two pieces of elastic engaging piece section magnetically attract magnets mounted on a frame of equipment respectively, so that the elastic engaging piece sections are not moved under the condition of some force applied thereto from outside, magnetic attraction between the magnets is comparatively firm, and for this reason the terminal cover can securely be mounted on the equipment.

Other objects and features of this invention will become understood from the following description with reference to the accompanying drawings.

BRIEF DESCRIPTION OF THE DRAWINGS

FIG. 1A is an explanatory view showing the terminal cover, and FIG. 1B is an explanatory view showing a frame of the equipment;

DESCRIPTION OF THE PREFERRED EMBODIMENTS

Figure 1A:
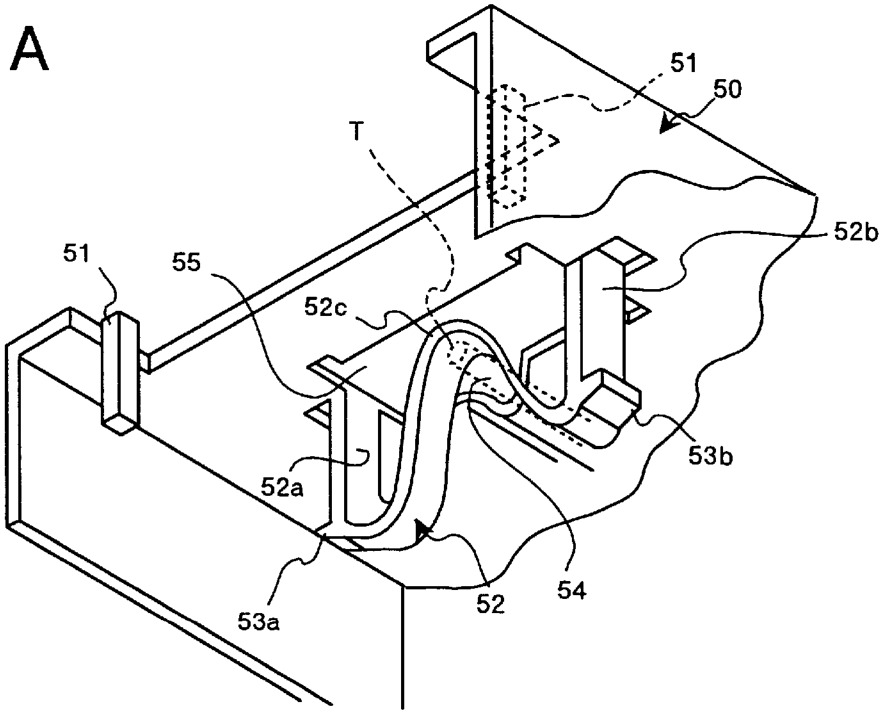
FIGS. 1A and 1B are perspective views each showing a terminal cover for electrical equipment according to Embodiment 1 of the present invention.
Figure 1B:
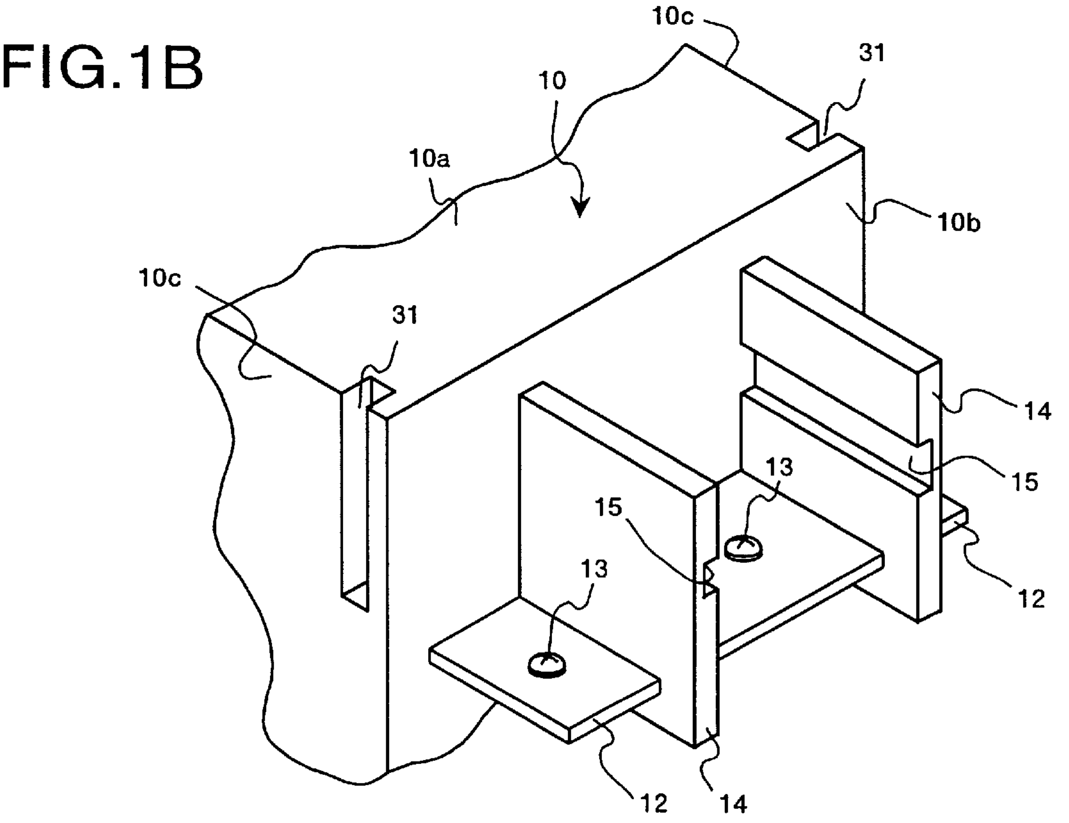

Detailed description is made hereinafter for preferred embodiments of a terminal cover for electrical equipment according to the present invention with reference to the related drawings. It should be noted that the same reference numerals are assigned to the sections in the embodiments described later corresponding to those in the conventional type of terminal cover, and description thereof is omitted therein.

FIGS. 1A and 1B to FIG. 15 show Embodiment 1 of the terminal cover for electrical equipment according to the present invention. In the figures, the reference numeral 50 indicates the terminal cover as a whole according to the present invention. The terminal cover 50 as a whole is made of electrical insulating plastics, and has vertical polar bodies 51 hanging downward integrally provided to the cover for insertably engaging in guide grooves 31 vertically formed on both of sidewall sections 10*c* of a frame 10 for electrical equipment (frame for equipment).

Monolithically molded on a rear side (bottom face) of the terminal cover 50 is a substantially W-shaped elastic engagement section 52. The elastic engagement section 52 is obtained by coupling two pieces of substantially U-shaped elastic engaging piece section 52*a* and 52*b* to each other, and the elastic engaging piece sections 52*a* and 52*b* are formed so that each of the outer edge sections thereof is integrally connected to the terminal cover 50 respectively and the other edge in the inner side thereof is coupled to that of the other one thereof with a bridging piece section 52*c* having a substantially U-shaped form turned upside down. Each of counter claw sections 53*a* and 53*b* is projecting at each of edge sections of a U-shaped form obtained by bending each of the elastic engaging piece sections 52*a* and 52*b* respectively so that the counter claw sections are provided outward in opposite directions respectively. The counter claw sections 53*a* and 53*b* are engaged in recesses 15 for engagement horizontally formed on the internal side faces of two pieces of interpole insulating barrier plate 14 opposite to each other.

Formed in the terminal cover 50 is a tool-inserting groove 54 for inserting a removing tool T into the internal side of the bridging piece section 52*c* having a substantially U-shaped form turned upside down. Mounting of this terminal cover 50 is realized by arranging it upward of the frame 10 for the equipment, inserting the vertical polar bodies 51 provided downward into guide grooves 31 formed on both of the side face sections 10*c* of the frame 10 for the equipment, pressing down the entire terminal cover 50, and sliding down the sticks 51 along the guide grooves 31.

When the terminal cover 50 is pressed down as far as a regular position where the cover is mounted so as to contact the top surface of the frame 10 for the equipment, the counter claw sections 53*a* and 53*b* of the elastic engaging piece sections 52*a* and 52*b* are engaged in the recesses 15 for engagement formed on the interpole insulating barrier plates 14 respectively. The terminal cover 50 is fixed to the frame 10 for equipment by this engagement.

This pair of substantially U-shaped elastic engaging piece sections 52*a* and 52*b* are connected to the terminal cover 50 at each of one edges thereof in a fixed state, and the other edges thereof are coupled to each other with the bridging piece section 52*c*, so that the elastic engaging piece sections 52*a* and 52*b* are not moved under the condition of some force applied thereto from the outside, and engagement between the counter claw sections 53*a*, 53*b* and recesses 15 for engagement is comparatively firmly realized.

Figure 5:
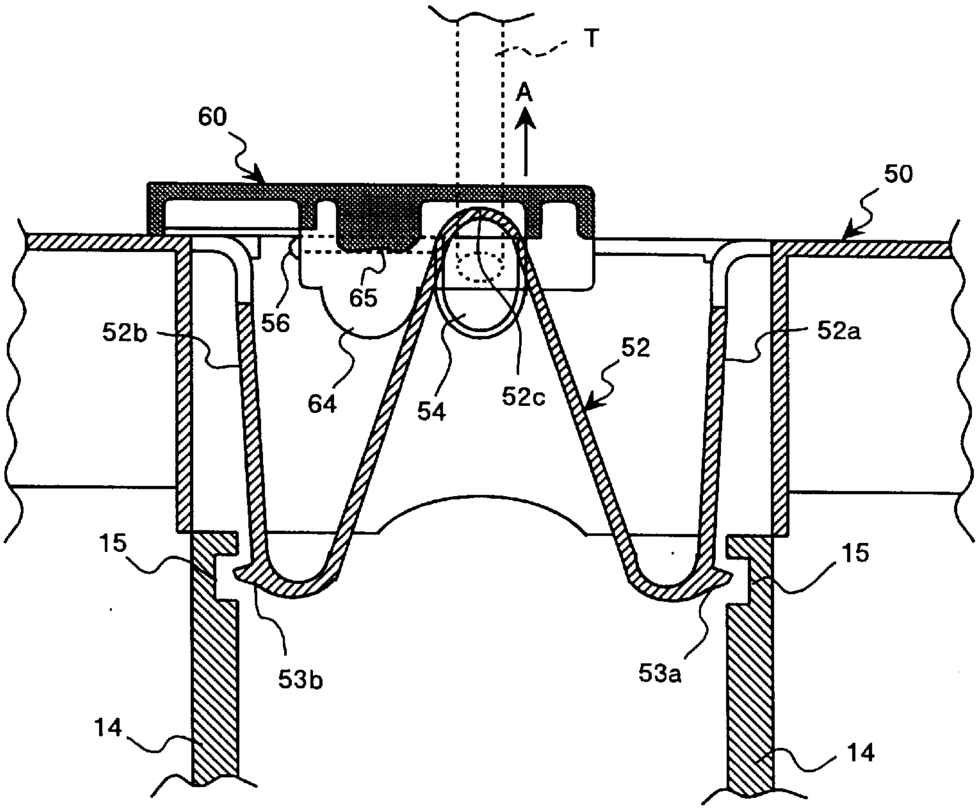
FIG. 5 is a cross-sectional view showing a disengaged state of counter claw sections according to Embodiment 1 taken along the line A—A in FIG. 2.

As shown in FIG. 5, through an operation of displacing the bridging piece section 52*c* upward, the counter claw sections 53*a* and 53*b* are removed from the recesses 15 for engagement so that the engagement between the counter claw sections 53*a*, 53*b* and the recesses 15 for engagement can be released.

Displacement upward of the bridging piece section 52*c* can be performed by inserting the tamper-type tool T for removal into the internal side of the bridging piece section 52*c* through the tool-inserting groove 54 and operating the removing tool T like a lever, and the terminal cover 50 is removed from the frame 10 for equipment by disengaging the counter claw sections 53*a*, 53*b* from the recesses 15 for engagement by displacing, due to movement and deformation of the bridging piece section 52*c* in the direction indicated by the arrow A, the counter claw sections 53*a* and 53*b* in a direction to which both sections are made closer to each other. Conversely, in order to make firm the engagement between the counter claw sections 53*a*, 53*b* and the recesses 15 for engagement, the bridging piece section 52*c* may not be deformed by restraining the movement thereof, and with this feature, engagement between the frame 10 for equipment and the terminal cover 50 is securely maintained.

As a lock mechanism for restraining movement of the bridging piece section 52*c* for the elastic engagement section 52 so as not to be deformed, a lock cap 60 is provided in the terminal cover 50. Projecting stripes 56 are formed in both edge sections of an opening 55 where the elastic engaging section 52 for the terminal cover 50 is provided, projections 61 as a stopper and slide guide pieces 62 are projecting on both sides of the lock cap 60, and, by holding the projecting stripes 56 between the projections 61 as a stopper and the slide guide pieces 62 in the vertical direction, the lock cap 60 is laterally slidably engaged with the terminal cover 50 in FIG. 2 to FIG. 8.

Mounting of the lock cap 60 is carried out by pressing down each of the projections 61 as a stopper in a state where the projection is matched to an extended section 57 of an opening 55. A projection 61' as one of the projections 61 as a stopper and an extended section 57' matching thereto are formed larger than the others, and with this combination, erroneous combination is avoided.

Figure 6:
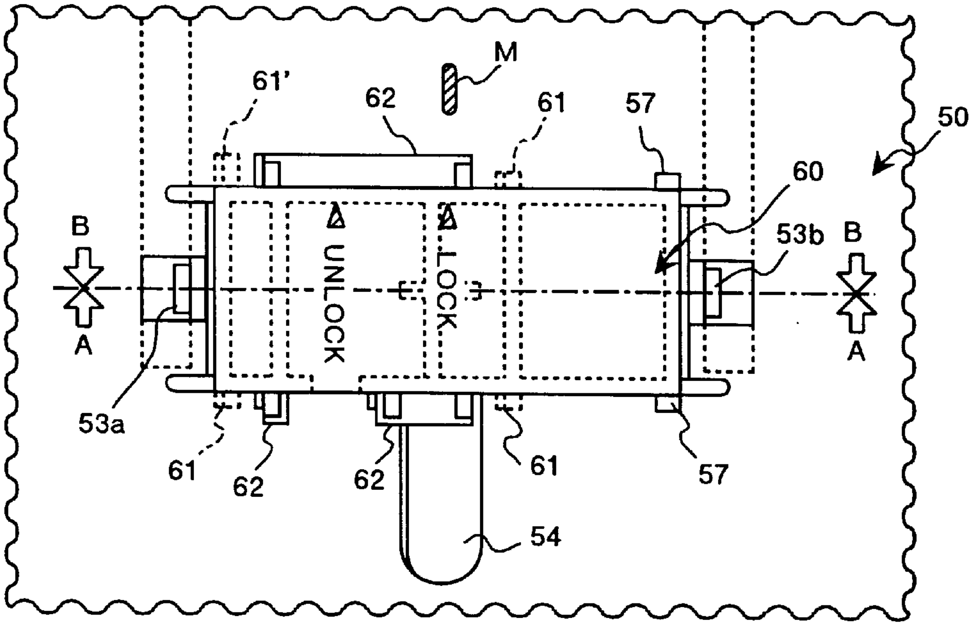
FIG. 6 is a plan view showing a locked state of the lock cap according to Embodiment 1.
Figure 7:
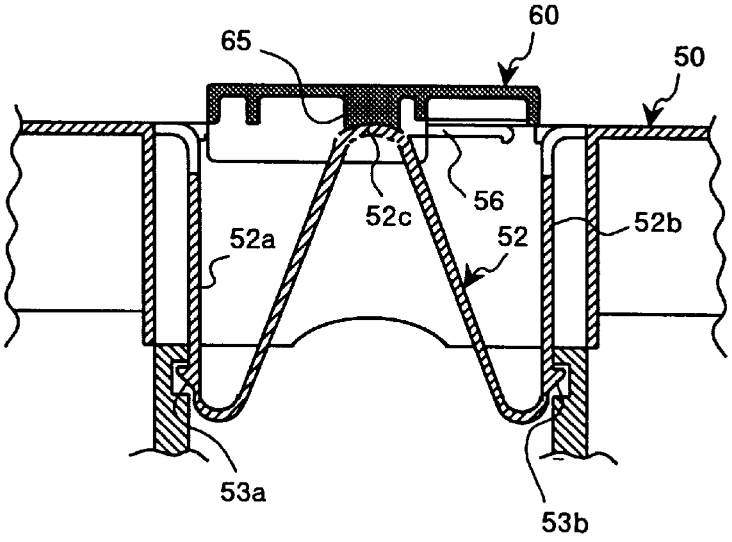
FIG. 7 is a cross-sectional view showing the locked state is according to Embodiment 1 taken along the line A—A in FIG. 6.
Figure 8:
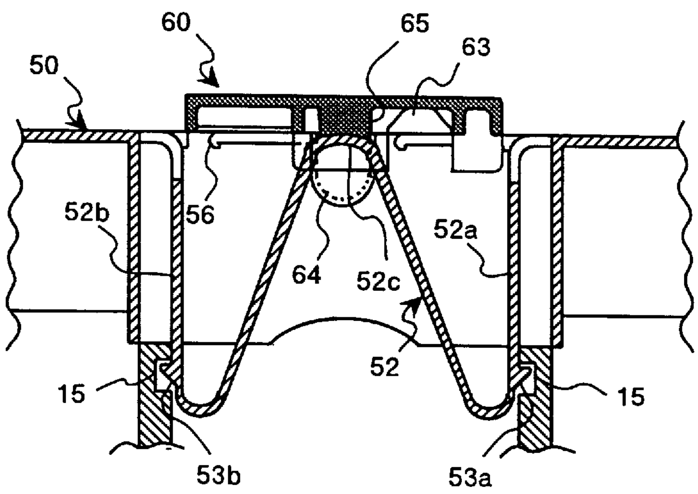
FIG. 8 is a cross-sectional view showing the locked state according to Embodiment 1 taken along the line B—B in FIG. 6.
Figure 9:
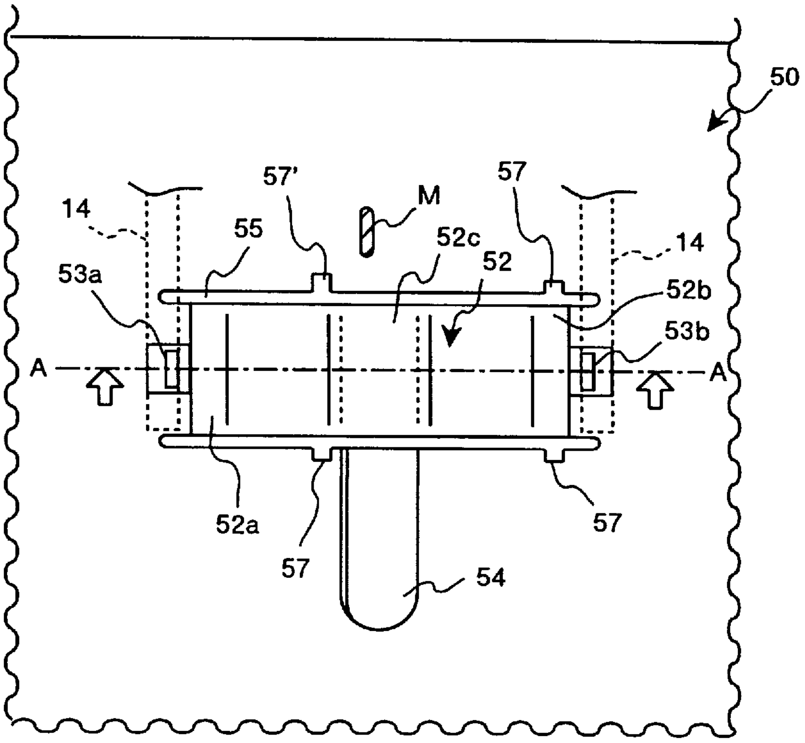
FIG. 9 is a plan view showing a state where the lock cap is removed according to Embodiment 1.
Figure 10:
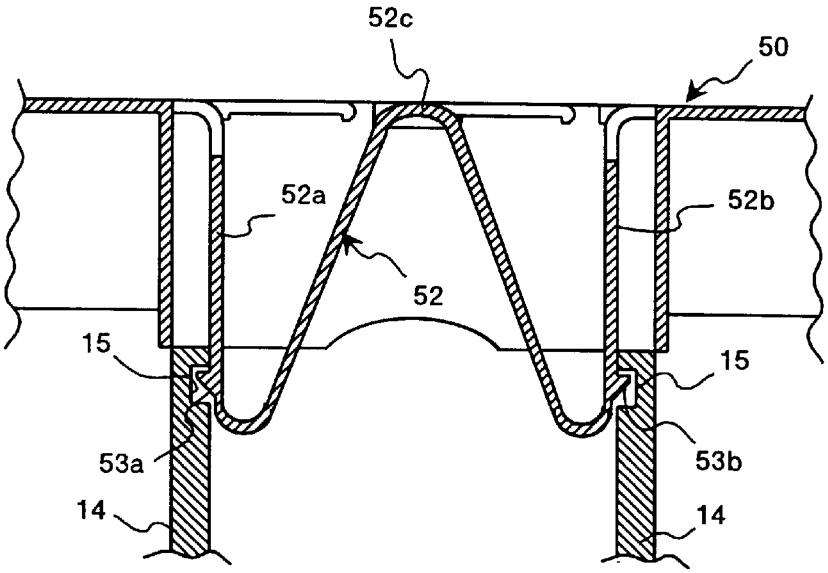
FIG. 10 is a cross-sectional view of the lock cap-removed state taken along the line A—A in FIG. 9.
Figure 11:
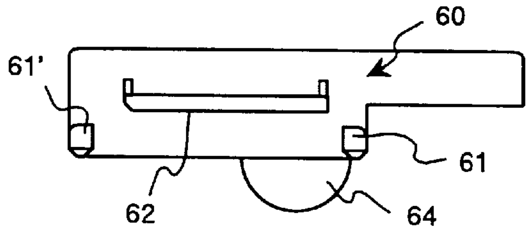
FIG. 11 is a left side view of the lock cap.
Figure 12:
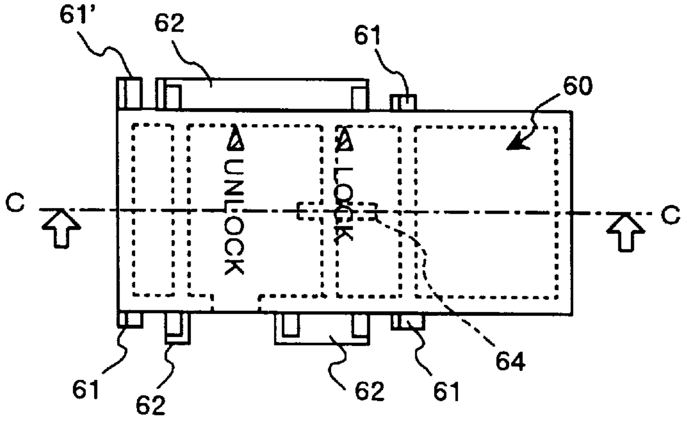
FIG. 12 is a plan view of the lock cap.
Figure 13:
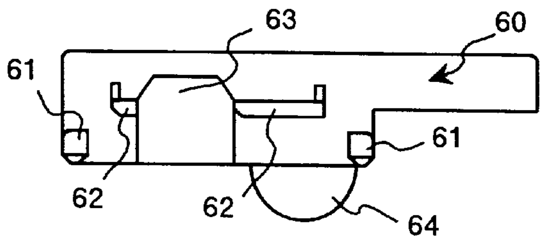
FIG. 13 is a right side view of the lock cap.
Figure 14:
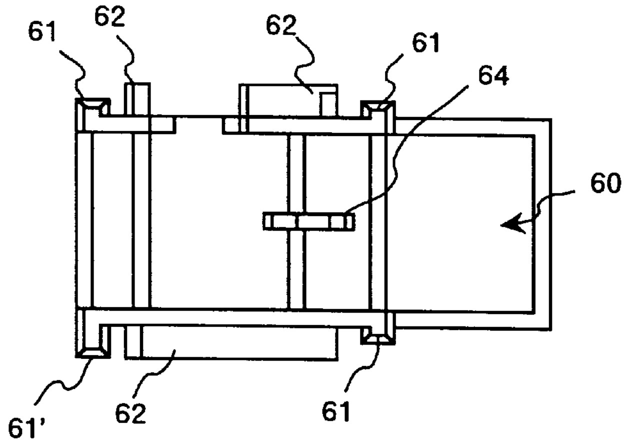
FIG. 14 is a bottom view of the lock cap.
Figure 15:
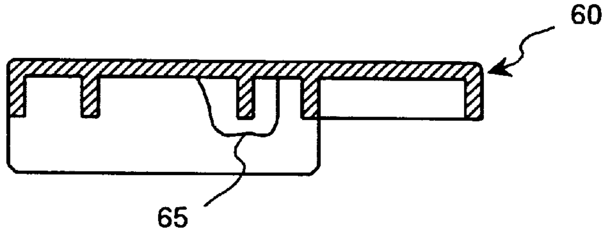
FIG. 15 is a cross-sectional view of the lock cap taken along the line C—C in FIG. 12.

The lock cap 60 is slidably provided in a section between an unlock position, as shown in FIG. 2 to FIG. 5, with a indicating mark M added to the top surface of the terminal cover 50 pointing to "UNLOCK" written on the top surface of the lock cap 60 and a lock position, as shown in FIG. 6 to FIG. 8, with the indicating mark M added to the top surface of the terminal cover 50 pointing to "LOCK" written on the top surface of the lock cap 60.

The lock cap 60 has an opening section 63 for having a tool-inserting groove 54 released by matching thereto at the unlock position, a guard section 64 for having the tool-inserting groove 54 be in its closed state by matching thereto at the lock position, and a restraining section 65 for engagement with the bridging piece section 52*c* of the elastic engaging section 52 at the lock position.

Figure 2:
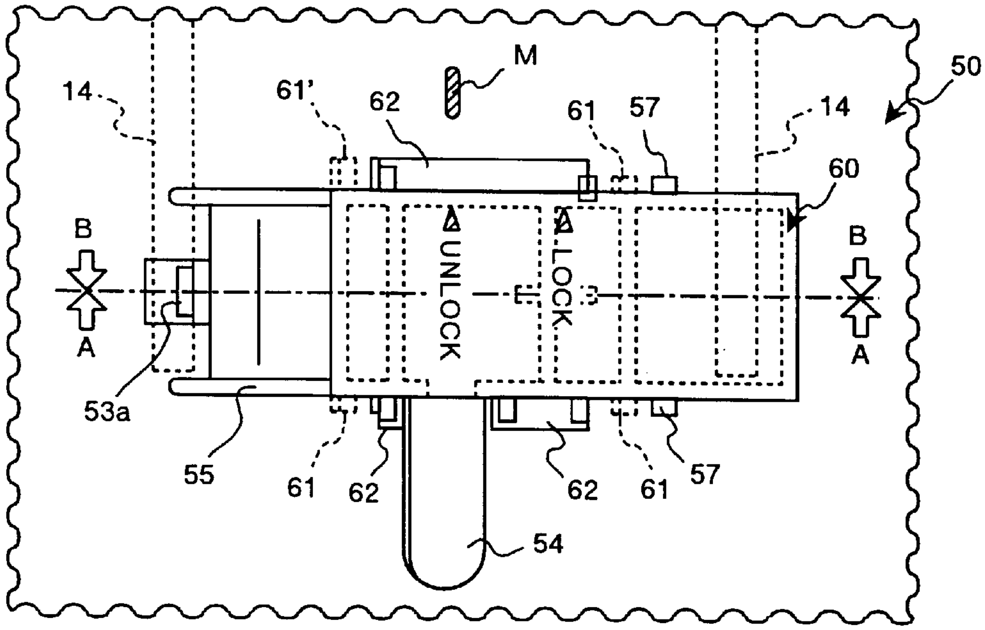
FIG. 2 is a plan view showing an unlocked state of a lock cap according to Embodiment 1.
Figure 3:
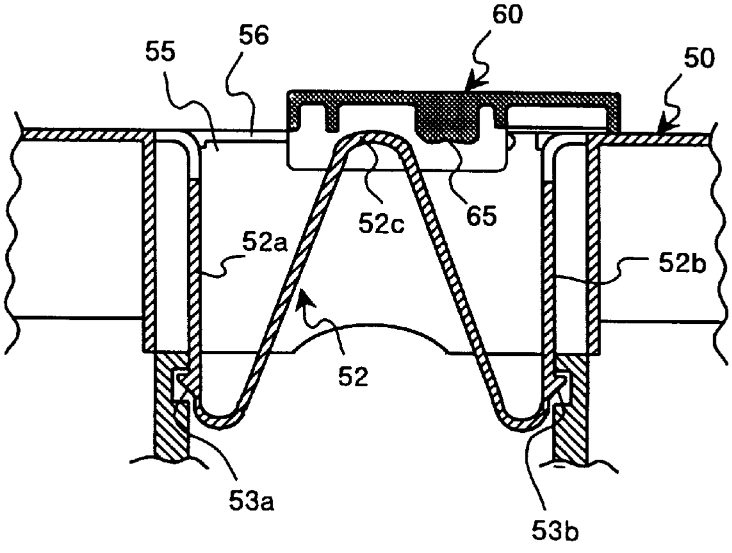
FIG. 3 is a cross-sectional view showing the unlocked state according to Embodiment 1 taken along the line A—A in FIG. 2.
Figure 4:
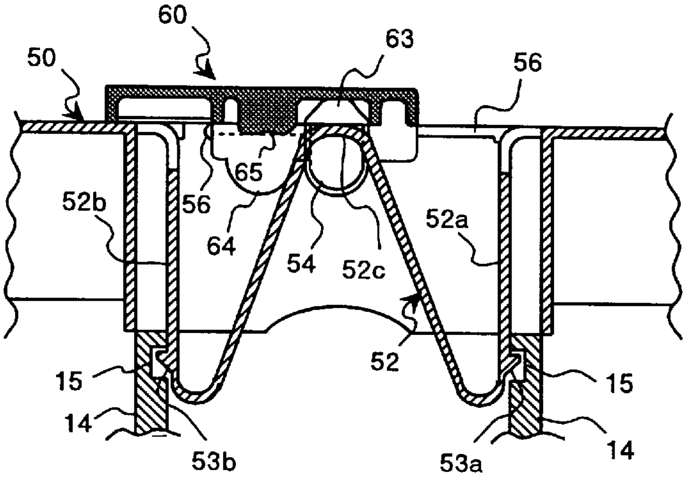
FIG. 4 is a cross-sectional view showing the unlocked state according to Embodiment 1 taken along the line B—B in FIG. 2.

When the lock cap 60 is placed at the unlock position as shown in FIG. 2 to FIG. 5, the guard section 64 is displaced to the right side from the tool-inserting groove 54, the restraining section 65 is disengaged from the bridging piece section 52*c* of the elastic engaging section 52 according to the function of engagement with the piece section, and the opening section 63 matches to the tool-inserting groove 54, so that the restraint of the tool-inserting groove 54 as well as of the bridging piece section 52*c* is released, and for this reason, as described above, or as shown in FIG. 5, by inserting the tamper type removing tool T into the internal side of the bridging piece section 52 through the tool-inserting groove 54 and operating the removing tool T like a lever so that the bridging piece section 52*c* can be moved and deformed in the direction indicated by the arrow A, the counter claw sections 53*a* and 53*b* are displaced in the direction to which both of the counter claw sections are made closer to each other, and the counter claw sections 53*a* and 53*b* are disengaged from the engagement in the recesses 15 for engagement, and after the operations, the terminal cover 50 together with the lock cap 60 can be removed from the frame 10 of the equipment.

When a tamper-proof state for inhibiting the terminal cover 50 from its being easily removed is effected by restraining movement of the bridging piece section 52 so as not to be deformed, the lock cap 60 placed at the unlock position is moved to the lock position as shown in FIG. 6 to FIG. 8 by being slid to the left side in the figure.

When the lock cap 60 is placed at the lock position, the opening section 63 is displaced to the left side from the tool-inserting groove 54, the guard section 64 matches to the tool-inserting groove 54, and the tool-inserting groove 54 is closed. With this operation, the removing tool T can not be inserted into the internal side of the bridging piece section 52*c*.

Also, the restraining section 65 deforms and engages the bridging piece section 52*c*, so that displacement upward of the bridging piece section 52*c*, namely displacement of the counter claw sections 53*a* and 53*b* in a direction to which they are disengaged from the engagement in the recesses 15 for engagement is restrained.

With those operations, engagement between the counter claw sections 53*a*, 53*b* and the recesses 15 for engagement is securely maintained under the condition where the lock cap 60 is placed at the lock position, so that the terminal cover 50 will never unintentionally be removed from the frame 10 of equipment.

Figure 16:
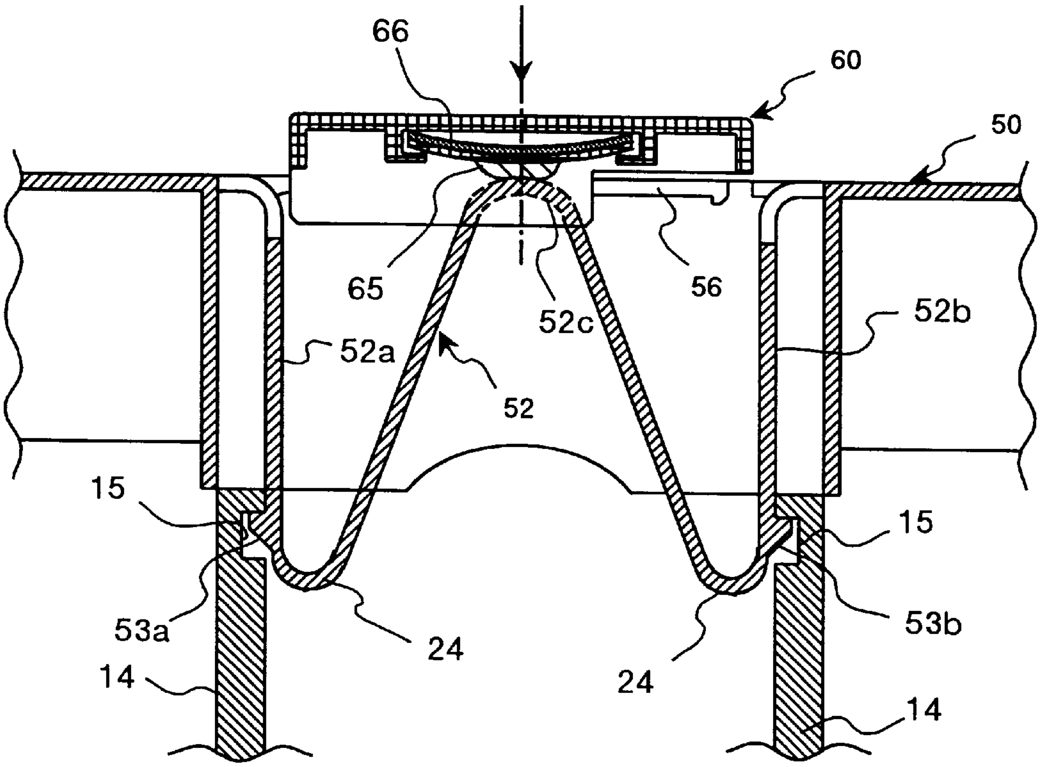
FIG. 16 is a cross-sectional view showing a key section of a terminal cover for electrical equipment according to Embodiment 2 of the present invention.

FIG. 16 shows Embodiment 2 of a terminal cover for electrical equipment according to the present invention. It should be noted that, in FIG. 16, the same reference numerals are assigned to the sections corresponding to those in FIGS. 1A and 1B to FIG. 15, and description thereof is omitted herein.

An element for increasing restraint force is added, in this embodiment, to a unit for restraining deformation and movement of a bridging piece section 52*c* in accordance with a rise in temperature in electrical equipment. Namely, a restraining section 65 is mounted on a lock cap 60 through a bimetal 66 formed by adhering metals to each other each having a different coefficient of thermal expansion. The bimetal 66 increases a projecting rate by being bent downward due to a rise in the temperature, which enhances the force to press the restraining section 65 against the bridging piece section 52*c*.

It is a general fact that a state where electrical equipment is actually used is accompanied by a rise in temperature therein, and by using this rise in temperature for bending characteristics of the bimetal 66, the temperature in the bimetal 66 increases in accordance with a rise in the temperature during operation of the electrical equipment at the time of lock state, and a projecting rate by bending the bimetal 66 downward increases, which enhances the force to press the restraining section 65 against the bridging piece section 52*c*, and then the bridging piece section 52*c* is pressed in a direction (downward) to which the counter claw sections 53*a* and 53*b* are not disengaged from the engagement in the recesses 15 for engagement, and for this reason, the engagement between the counter claw sections 53*a*, 53*b* and the recesses 15 for engagement is much more firm.

With this feature, mounting strength of the terminal cover 50 can sufficiently be maintained even under the high temperature. It should be noted that the bimetal 66 may be replaced with a shape-memory alloy for so deforming as to displace the restraining section 65 downward in accordance with a rise in temperature in the alloy.

Figure 17:
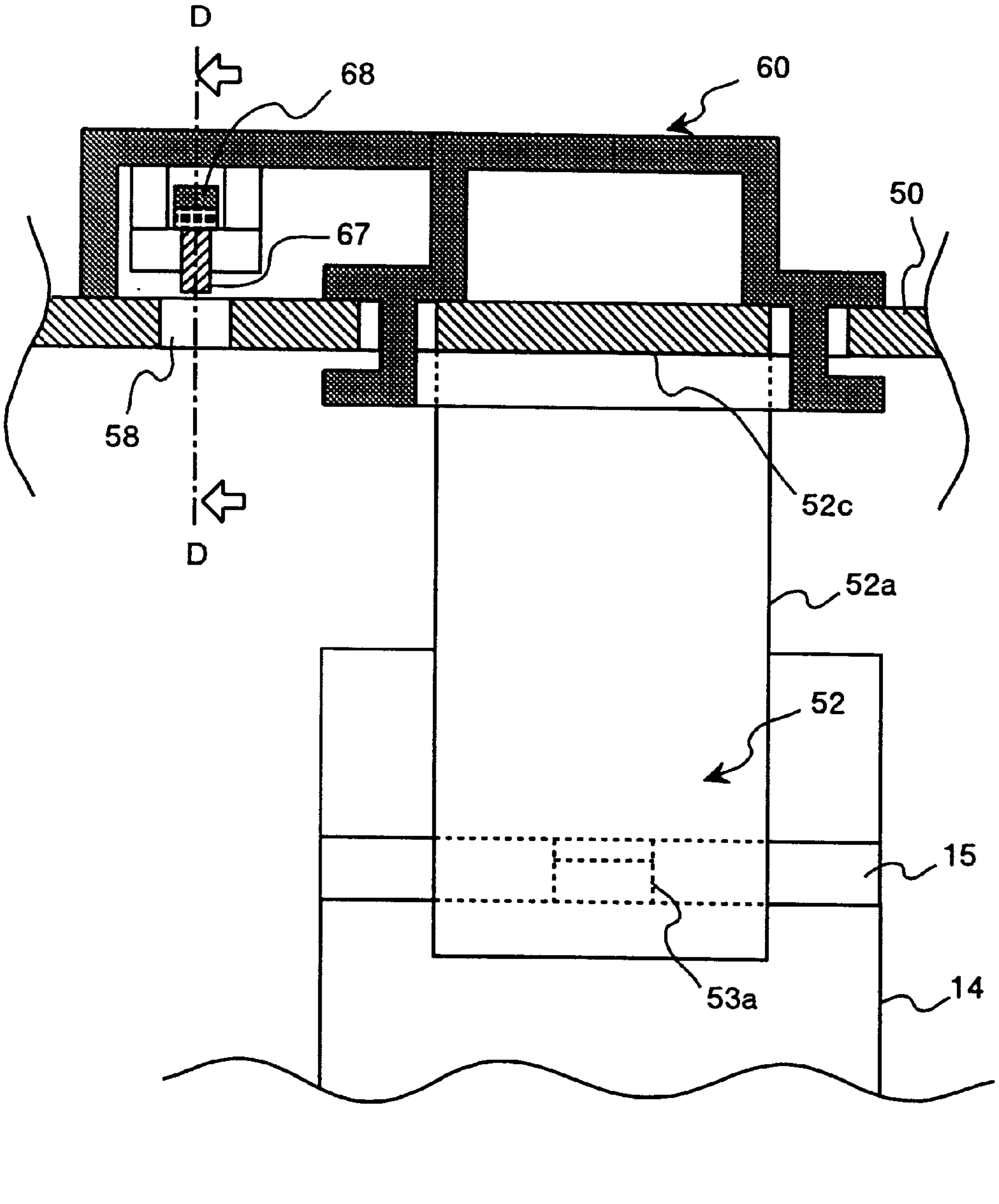
FIG. 17 is a cross-sectional view showing a key section of a terminal cover for electrical equipment according to Embodiment 3 of the present invention.
Figure 18:
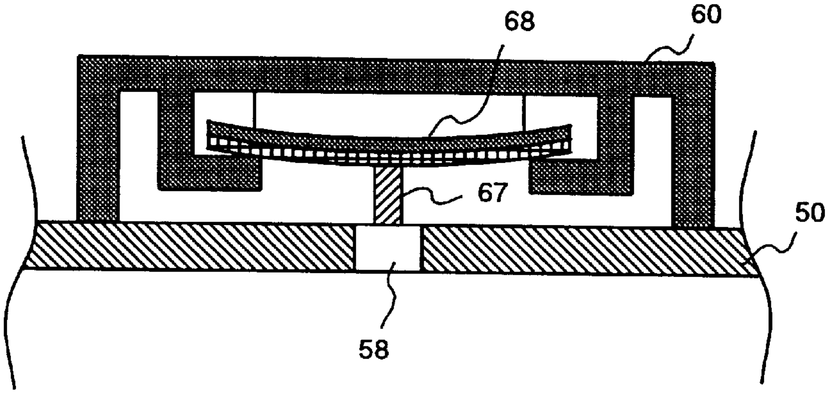
FIG. 18 is a cross-sectional view of the cover taken along the line D—D in FIG. 17.

FIG. 17 and FIG. 18 show Embodiment 3 of a terminal cover for electrical equipment according to the present invention. It should be noted that, in FIG. 17 and FIG. 18, the same reference numerals are also assigned to the sections corresponding to those in FIGS. 1A and 1B to FIG. 15, and description thereof is omitted herein.

In this embodiment, a lock mechanism for locking a lock cap 60 to a lock position under a high temperature is incorporated in the lock cap 60. This lock mechanism comprises a lock pin 67 for selectively being engaged in a lock hole 58 formed on the terminal cover 50 under the condition where the lock cap 60 is placed at the lock position and restraining the lock cap 60 to the lock position, and a bimetal 68 held by the lock cap 60 for carrying the lock pin 67. The bimetal 68 increases a projecting rate by bending the bimetal downward due to a rise in the temperature, which makes the lock pin 67 and the lock hole 58 engaged in each other.

With this feature, during operation of electrical equipment in which the temperature in the equipment is higher than a specified value, the lock pin 67 is engaged in the lock hole 58 due to deformation of the bimetal 68, the lock cap is incapable of sliding and is restrained to the lock position. Accordingly, the terminal cover 50 is inhibited, during the operation of the electrical equipment, from its being removed from the equipment. It should be noted that the bimetal 68 may be replaced with a shape-memory alloy for so deforming as to displace the lock pin 67 downward in accordance with a rise in temperature in the alloy.

Figure 19:
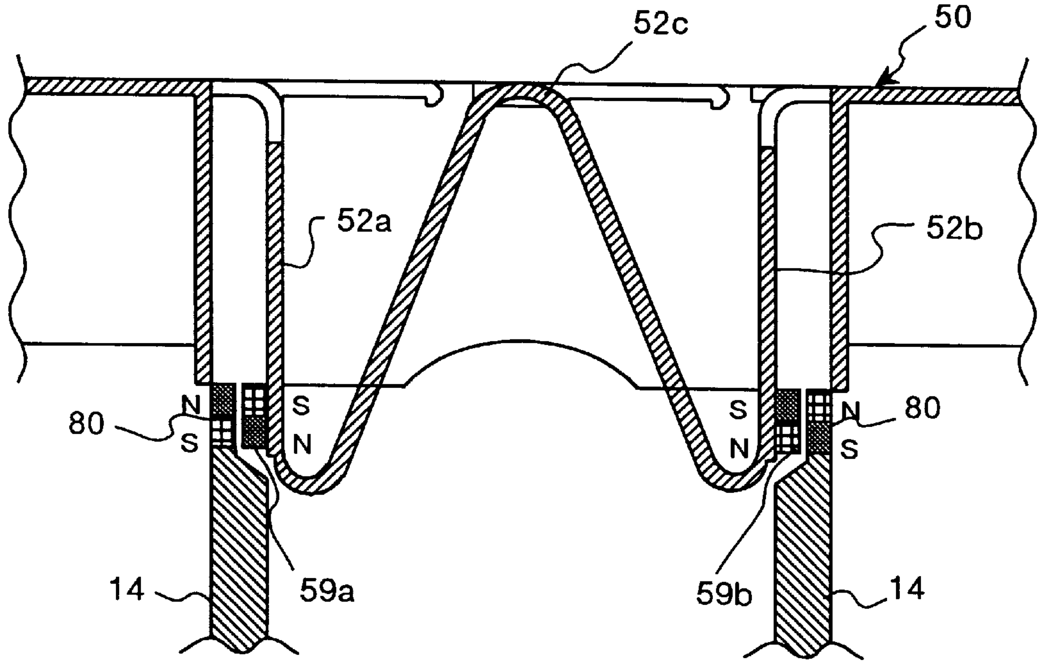
FIG. 19 is a cross-sectional view showing a key section of a terminal cover for electrical equipment according to Embodiment 4 of the present invention.

FIG. 19 shows Embodiment 4 of a terminal cover for electrical equipment according to the present invention. It should be noted that, in FIG. 19, the same reference numerals are also assigned to the sections corresponding to those in FIGS. 1A and 1B to FIG. 15, and description thereof is omitted herein.

In this embodiment, magnets 59*a* and 59*b* are mounted, in replace of the counter claw sections 53*a* and 53*b*, on edge sections each of a U-shaped form obtained by bending each of the elastic engaging piece sections 52*a* and 52*b*, and magnets 80 magnetically attracting the magnets 59*a* and 59*b* are mounted on interpole insulating barrier plates 14 respectively. In this embodiment, when the terminal cover 50 is placed at a regular mounted position, the north pole and the south pole of each of the magnets 59*a* and 59*b* are opposite to the south pole as well as to the north pole of each of the magnets 80, and the terminal cover 50 is fixed to the frame 10 of the equipment by the force of magnetic attraction.

With this feature, similarly to the case of Embodiment 1, engagement between the frame 10 of equipment and the terminal cover 50 are securely maintained.

Figure 20:
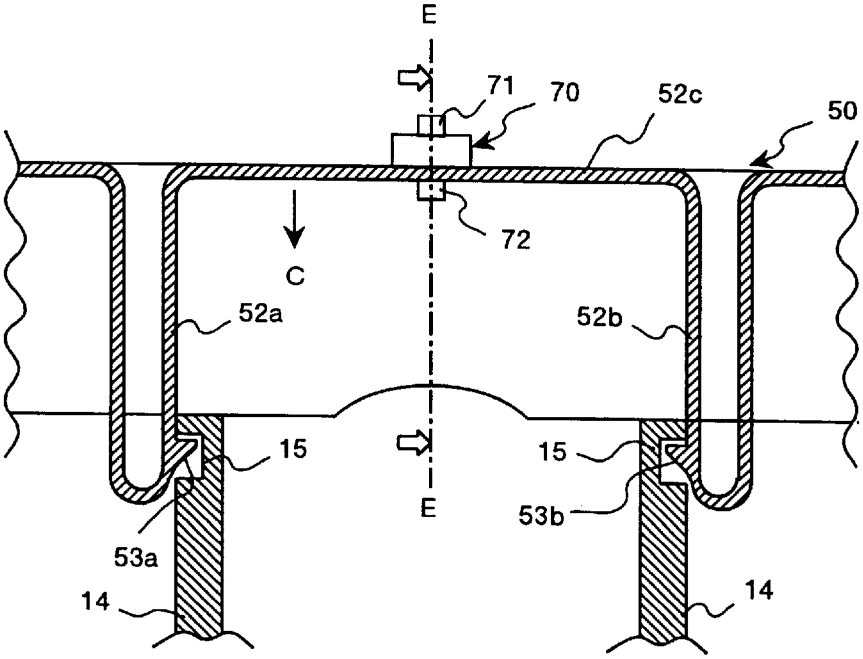
FIG. 20 is a cross-sectional view showing a key section of a terminal cover for electrical equipment according to Embodiment 5 of the present invention.
Figure 21:
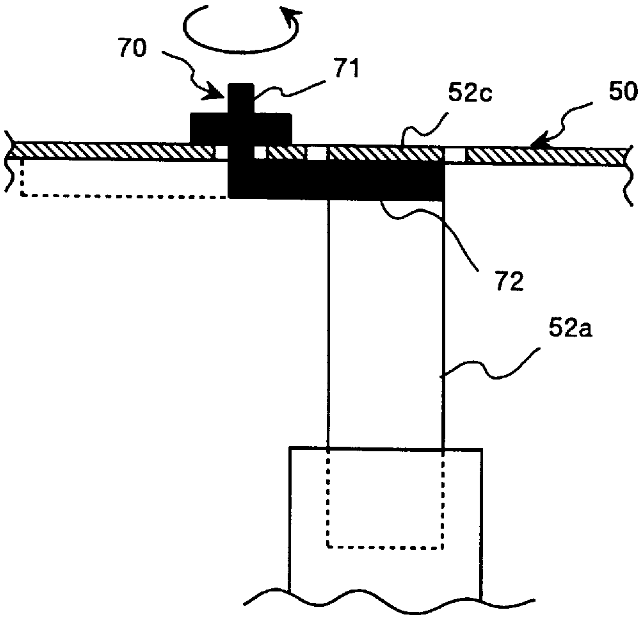
FIG. 21 is a cross-sectional view of the cover taken along the line E—E in FIG. 20.
Figure 22:
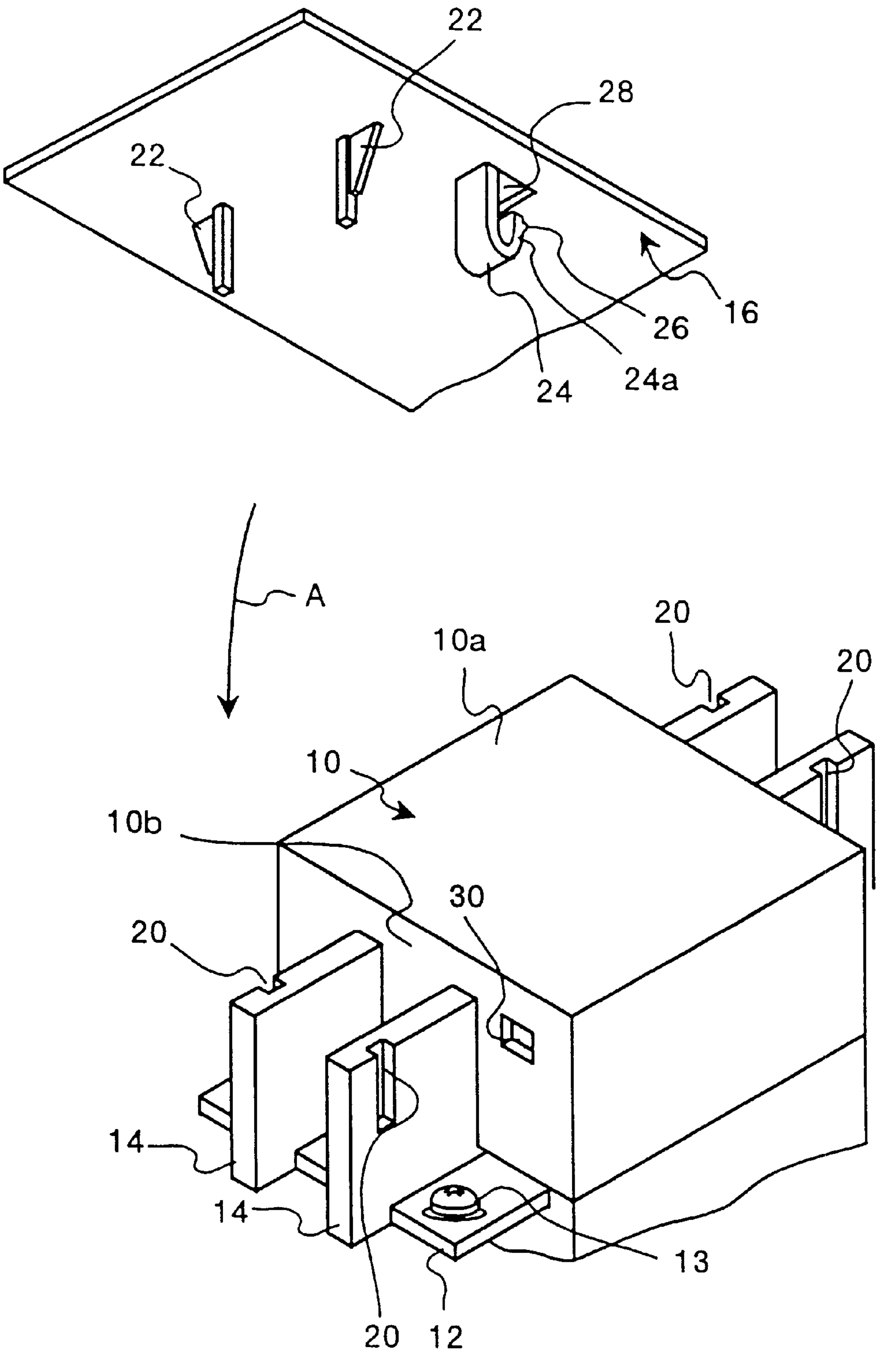
FIG.22 PRIOR ART
FIG. 22 is a perspective view showing a terminal cover and a construction of how to mount the cover onto electrical equipment based on the conventional technology.
Figure 23:
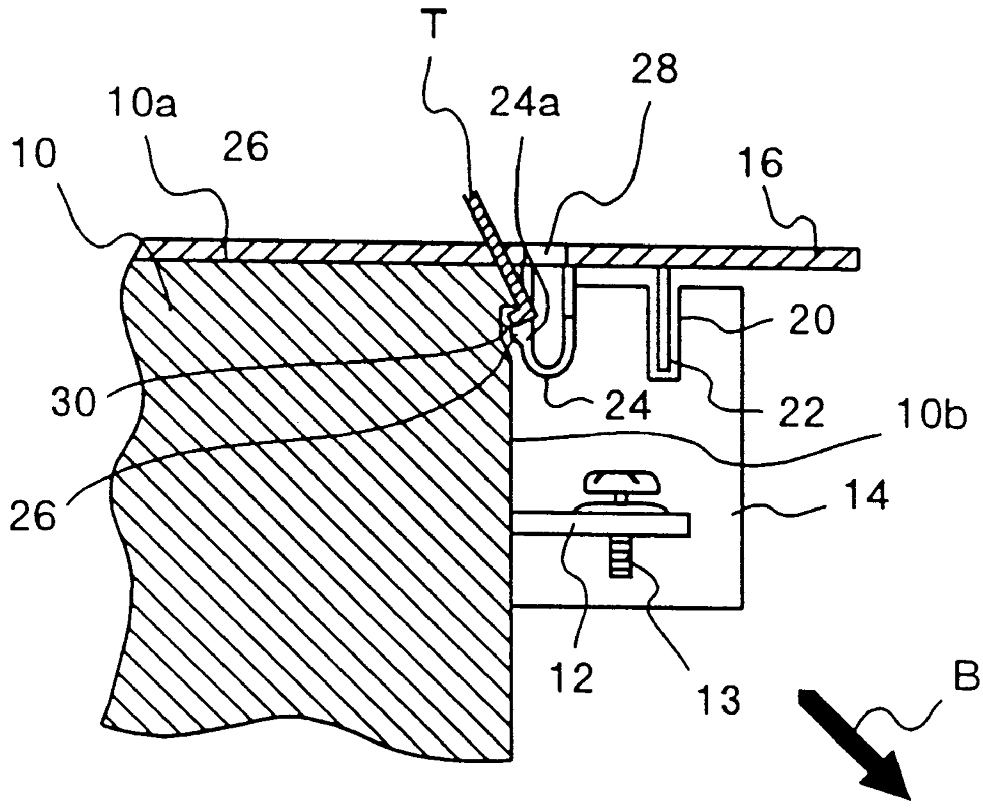
FIG.23 PRIOR ART
FIG. 23 is an explanatory view showing the terminal cover and the cover-mounted construction based on the conventional technology.

FIG. 20 and FIG. 21 show Embodiment 5 of a terminal cover for electrical equipment according to the present invention. It should be noted that, in FIG. 20 and FIG. 21, the same reference numerals are also assigned to the sections corresponding to those in FIGS. 1A and 1B to FIG. 15, and description thereof is omitted herein.

In this embodiment, elastic engaging piece sections 52 and 52*b* are so formed that each of outer edge sections thereof is integrally connected to the terminal cover 50 and the other edge in the inner side thereof is coupled to that of the other one with a flat-shaped bridging piece section 52*c* having a comparatively large surface. Counter claw sections 53*a* and 53*b* are projecting at edge sections each of a U-shaped form obtained by bending each of the elastic engaging piece sections 52*a* and 52*b* inward in opposite sides respectively.

The counter claw sections 53*a* and 53*b* are engaged in recesses 15 for engagement horizontally formed on the outer sides of two pieces of interpole insulating barrier plate 14 opposite to each other. The terminal cover 50 is fixed to the frame 10 for equipment by this engagement. Removal of the terminal cover 50 from the frame is carried out by pressing downward the flat-shaped bridging piece section 52*c* to be recessed, which makes the elastic engaging piece sections 52 and 52*b* inclined, and by disengaging the counter claw section 53*a* and 53*b* from the engagement in the recesses 15 for engagement.

Rotatably attached to the terminal cover 50 is a lock member 70. The lock member 70 comprises a knob section 71 for a rotating operation and a restraining piece 72 for inhibiting the bridging piece section 52*c* from its being recessed and deformed by turning backward to the rear surface of the bridging piece section 52*c*.

When the terminal cover 50 is placed at the unlock position indicated by the broken line, the bridging piece section 52*c* is not inhibited from its being recessed and deformed because the restraining piece 72 is positioned away from the bridging piece section 52*c*, but when the terminal cover 50 is placed at the lock position indicated by the solid line shown in FIG. 21, the restraining piece 72 inhibits the bridging piece section 52*c* from its being recessed and deformed by turning backward to the rear surface of the bridging piece section 52*c*.

With this feature, similarly to the case of Embodiment 1, the terminal cover 50 will never unintentionally be removed from the frame 10 of equipment.

As clearly understood from the above description, with the invention, there are two pieces of substantially U-shaped elastic engaging piece section each with an outer edge thereof integrally connected to the terminal cover and the other edge in the inner side thereof coupled to that of the other one with a bridging piece section, and the terminal cover is fixed to a frame of equipment by engaging the counter claw sections formed on the two pieces of elastic engaging piece section in recesses for engagement formed on the frame of the equipment respectively, so that the elastic engaging piece sections are not moved under the condition of some force applied thereto from outside, and engagement between the counter claw sections and the recesses for engagement is comparatively firm, and for this reason, the terminal cover can securely be mounted on the equipment. In addition, the engagement between the counter claw sections and the recesses for engagement can accurately be released in response to an operation of displacing the bridging piece section.

With the invention, a bridging piece section has a substantially U-shaped form turned upside down, a substantially W-shaped form is formed with an entire body including two pieces of elastic engaging piece sections, and counter claw sections are projecting each at an end section of a U-shaped form obtained by bending each of the two pieces of elastic engaging piece section outward in opposite directions respectively, and the terminal cover is fixed to a frame of equipment by engaging the counter claw sections in recesses for engagement formed on the frame of the equipment respectively, so that the elastic engaging piece sections are not moved under the condition of some force applied thereto from outside, engagement between the counter claw sections and the recesses for engagement is comparatively firm, and the terminal cover can securely be mounted on the equipment. In addition, the engagement between the counter claw sections and the recesses for engagement can accurately be released in response to an operation of displacing the bridging piece section.

With the invention, a bridging piece section is flat, and counter claw sections are projecting each at an end section of a U-shaped form obtained by bending each of the two pieces of elastic engaging piece section inward in opposite sides respectively, and the terminal cover is fixed to a frame of equipment by engaging the counter claw sections in recesses for engagement formed on the frame of the equipment respectively, so that the elastic engaging piece sections are not moved under the condition of some force applied thereto from outside, engagement between the counter claw sections and the recesses for engagement is comparatively firm, and the terminal cover can securely be mounted on the equipment. In addition, also in this case, the engagement between the counter claw sections and the recesses for engagement can accurately be released in response to an operation of displacing the bridging piece section.

With the invention, deformation and movement of a bridging piece section in a direction to which counter claw sections are displaced from engagement in recesses for engagement provided on the frame of equipment are selectively restrained by a restraining section for a lock unit, so that reliability and durability of mounting the terminal cover to electrical equipment can be obtained even under such bad conditions that vibrations or shocks are applied thereto.

With the invention, it is selectively inhibited by a guard section of a lock unit to insert a removing tool into the internal side of a bridging piece section, so that tamper proof is applied to the invention, and for this reason the terminal cover can be prevented from its unintentional removal from equipment.

With the invention, restraint force to a bridging piece section by a restraining section increases in accordance with a rise in temperature in electrical equipment, so that the terminal cover is more firmly fixed to electrical equipment in accordance with a rise in the temperature, and for this reason the terminal cover is harder to be removed from the electrical equipment during operation of the electrical equipment.

With the invention, restraint force to a bridging piece section by a restraining section increases through deformation of bimetal or a shape-memory alloy in accordance with a rise in temperature in electrical equipment, so that the terminal cover is more firmly fixed to electrical equipment in accordance with a rise in the temperature, and for this reason the terminal cover is harder to be removed from the electrical equipment during operation of the electrical equipment.

With the invention, a lock cap is restrained to a lock position when temperature in electrical equipment increases, so that the terminal cover can be prevented from its being removed during operation of the electrical equipment.

With the invention, a lock cap is restrained to a lock position by bimetal or a shape-memory alloy when temperature in electrical equipment increases, so that the terminal cover can be prevented from its being removed during operation of the electrical equipment.

With the invention, it is selectively inhibited by a lock member that a flat bridging piece section is recessed and deformed, so that tamper proofing is applied to the invention, and for this reason the terminal cover can be prevented from its unintentional removal from equipment.

With the invention, there are two pieces of substantially U-shaped elastic engaging piece section each with an outer edge thereof integrally connected to the terminal cover and the other edge in the inner side thereof coupled to that of the other one with a bridging piece section, and magnets mounted on the two pieces of elastic engaging piece section magnetically attract magnets mounted on a frame of equipment respectively, so that the elastic engaging piece sections are not moved under the condition of some force applied thereto from outside, magnetic attraction between the magnets is comparatively firm, and for this reason the terminal cover can securely be mounted on the equipment.

This application is based on Japanese patent application No. HEI 10-084488 filed in the Japanese Patent Office on Mar. 30, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A terminal cover for electrical equipment comprising two pieces of substantially U-shaped elastic engaging piece section each with an outer edge thereof integrally connected to the terminal cover and the other edges thereof are coupled to each other with a bridge piece section; wherein said two pieces of elastic engaging piece section each have a counter claw section formed thereon respectively, and said terminal cover is fixed to a frame of equipment by engaging the counter claw sections in recesses for engagement formed on the frame of the equipment respectively.

2. A terminal cover for electrical equipment according to claim 1, wherein said bridge piece section has a substantially U-shaped form turned upside down, a substantially W-shaped form is formed with an entire body including the two pieces of elastic engaging piece section, and said counter claw sections are projecting each at an end section of a U-shaped form obtained by bending each of the two pieces of elastic engaging piece section outward in opposite directions respectively.

3. A terminal cover for electrical equipment according to claim 2, further comprising a lock unit which is a lock cap having a restraining section and a guard section for selectively inhibiting a removing tool from being inserted into an internal side of said bridge piece section.

4. A terminal cover for electrical equipment according to claim 3, further comprising a lock unit which has an element for increasing restraint force to said bridge piece section by a restraining section in accordance with a rise in temperature in an electrical equipment.

5. A terminal cover for electrical equipment according to claim 3, further comprising an element for increasing restraint force to said bridge piece section by a restraining section in accordance with a rise in temperature in an electrical equipment is bimetal or a shape-memory alloy.

6. A terminal cover for electrical equipment according to claim 3, wherein said lock cap is movably provided in between a lock position for restraining deformation and movement of said bridge piece section and an unlock position for allowing the deformation and movement thereof, and wherein said lock unit restrains said lock cap to said lock position when a temperature in electrical equipment increases.

7. A terminal cover for electrical equipment according to claim 6, wherein the lock unit for restraining said lock cap to said lock position when the temperature in an electrical equipment increases is made of bimetal or shape-memory alloy.

8. A terminal cover for electrical equipment according to claim 1, wherein said bridge piece section is flat, and each of said counter claw sections projects at an end section of a U-shaped form obtained by bending each of the two pieces of elastic engaging piece section inward in opposite sides respectively.

9. A terminal cover for electrical equipment according to claim 8, further comprising a lock unit which is a lock member for selectively inhibiting said flat bridge piece section from being recessed and deformed.

10. A terminal cover for electrical equipment according to claim 1, further comprising a lock unit having a restraining section for selectively restraining deformation and movement of said bridge piece section in a direction to which said counter claw sections are displaced from engagement in said recesses for engagement provided on the frame of the equipment.

11. A terminal cover for electrical equipment according to claim 10, wherein said lock unit has an element for increasing restraint force to said bridge piece section by said restraining section in accordance with a rise in temperature in an electrical equipment.

12. A terminal cover for electrical equipment according to claim 10, wherein an element for increasing restraint force to said bridge piece section by said restraining section in accordance with a rise in temperature in an electrical equipment is bimetal or a shape-memory alloy.

13. A terminal cover for electrical equipment comprising two pieces of substantially U-shaped elastic engaging piece section each with an outer edge thereof integrally connected to the terminal cover and the other edges thereof are coupled to each other with a bridge piece section; wherein said two pieces of elastic engaging piece section each have a magnet mounted thereon respectively, and said terminal cover is fixed to a frame of equipment by magnetically attracting said magnets to magnets mounted on the frame of the equipment respectively.

* * * * *